Feb. 23, 1926.

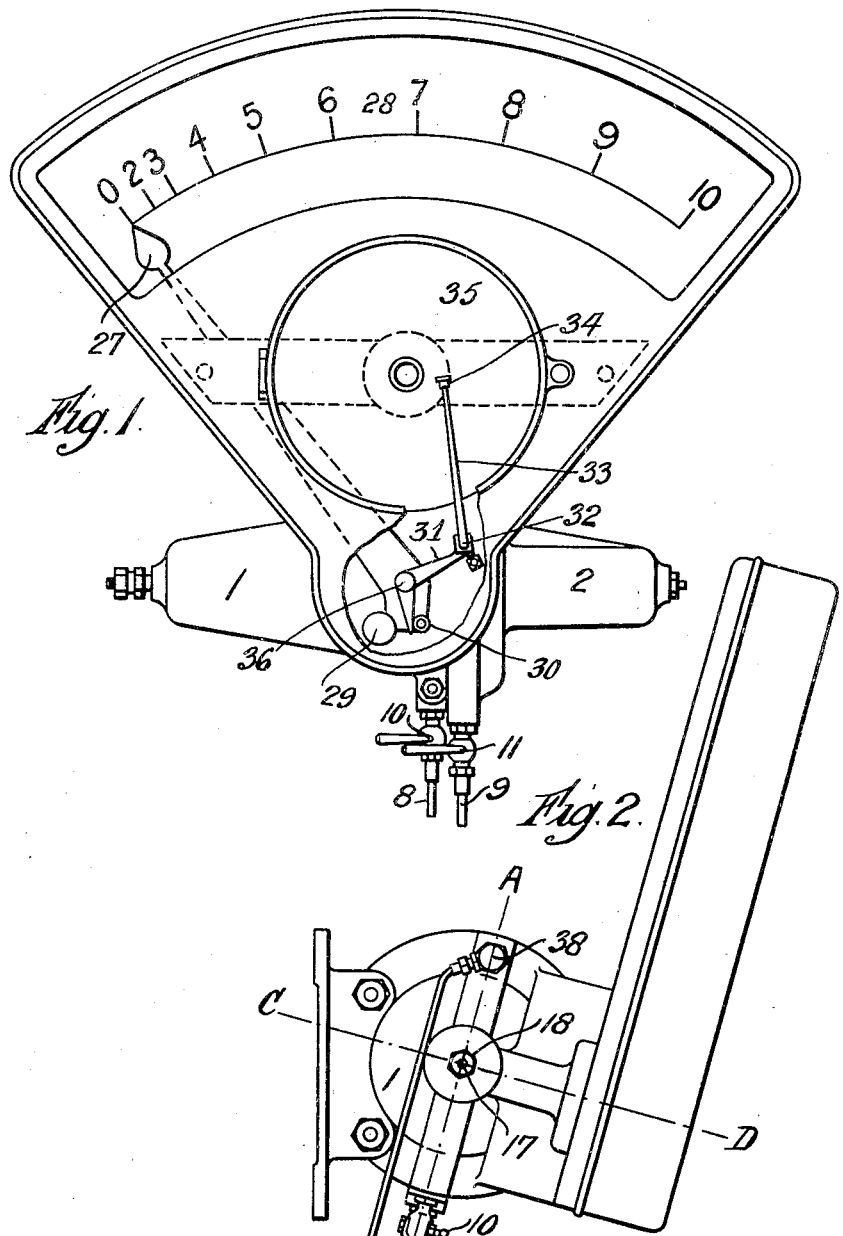

J. L. HODGSON

FLUID METER

Filed April 23, 1923      2 Sheets-Sheet 2

1,574,577

Inventor:
John Lawrence Hodgson,
By his Attorneys,
Baldwin Wight

Patented Feb. 23, 1926.

1,574,577

UNITED STATES PATENT OFFICE.

JOHN LAWRENCE HODGSON, OF EGGINGTON HOUSE, NEAR LEIGHTON BUZZARD, ENGLAND, ASSIGNOR TO GEORGE KENT, LIMITED, OF LONDON, ENGLAND.

FLUID METER.

Application filed April 23, 1923. Serial No. 633,945.

*To all whom it may concern:*

Be it known that I, JOHN LAWRENCE HODGSON, a subject of the King of Great Britain, residing at Eggington House, near Leighton Buzzard, Bedfordshire, England, have invented a new and useful Improvement in Fluid Meters, of which the following is a specification.

This invention relates to instruments which measure the flow of a fluid by means of different pressures obtained from the fluid by a Venturi tube, a Pitot tube, an orifice, or the like, and applied to opposite sides of a diaphragm, the movements of which, owing to varying differences of pressure, cause the movement of an indicating or recording arm.

The object of this invention is to provide an instrument in which the pointer or pen arm or other external part which is moved by the differential pressure may be made to have any desired movement for any given applied differential pressure, and when once the instrument is adjusted the diaphragm may be removed or replaced without disturbing the adjustment of the meter.

Figure 3:
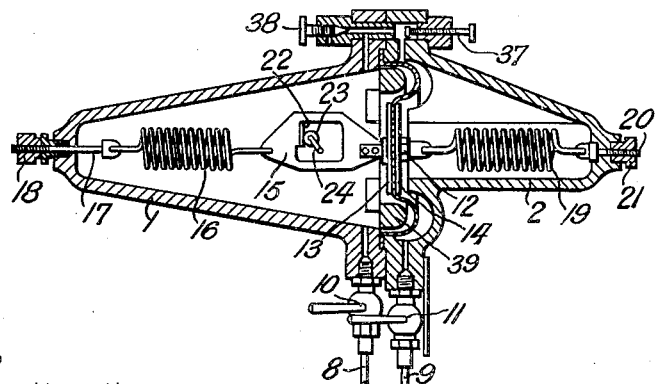
Figure 8:
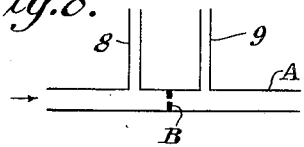
Figure 4:
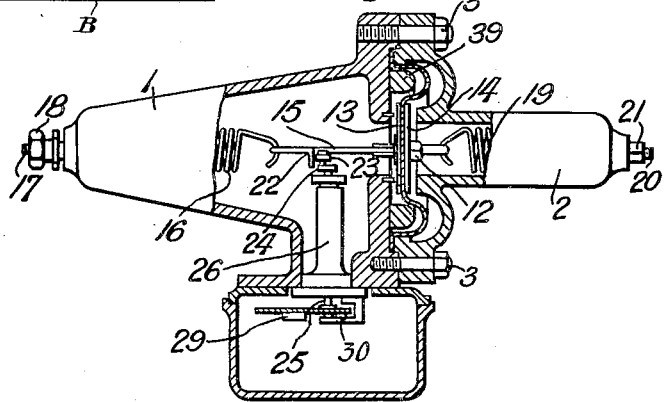
Figure 5:
Figures 6, 7:
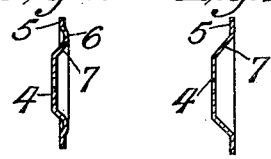
Figure 9:
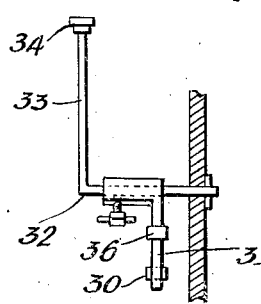

The invention is illustrated by the accompanying drawings, Figure 1 of which is a front view of an instrument which indicates the rate of flow by a pointer and also records the rate of flow on a chart, Figure 2 is a side view, Figure 3 a section on the line A—B of Figure 2 and Figure 4 a part section on the line C—D. Figures 5, 6 and 7, show alternative forms of diaphragms. Figure 8 is a diagrammatic view of a conventional means for attaining a pressure difference. Fig. 9 is a detail view.

1, 2, are two casings connected together by bolts 3 passing through their flanges and between these flanges is secured a diaphragm which is one of the forms shown in Figures 5, 6 and 7. It will be noticed that the central portion of the diaphragm is flat and its plane is removed from the plane of the rim of the diaphragm which is clamped between the flanges. The central portion 4 is connected to the rim 5 in the form shown in Figure 5 by a corrugation 6, in the form shown in Figure 6 by a portion 7 in the shape of the frustum of a cone and also by a corrugation 6, while in the form shown in Figure 7 the connection simply consists of the portion 7 in the shape of the frustum of a cone. The diaphragm thus separates chamber 1 from chamber 2. The pressures, the difference between which actuates the indicator, are admitted to the chambers 1, 2, by pipes 8, 9, 8 admitting the higher pressure to the chambers 1 and 9 the lower pressure to the chamber 2. These pipes 8 and 9 communicate with a pipe A in which is a restricted portion B whereupon a pressure differential is attained in an old and well known manner. Obviously this pressure differential may be attained in any other desired manner. These pipes are provided with cocks 10, 11, which are so arranged that cock 10 cannot be opened before cock 11 is opened and that cock 10 has to be closed before cock 11 is closed, so that it is impossible for the high pressure to be present in chamber 1 unless the low pressure is present in chamber 2 and thus risk of damage to the diaphragm is prevented. The central portion 4 of the diaphragm is clamped by means of a nut 12 between two metal plates 13, 14. The plate 13 is connected to a plate 15 which itself is connected to one end of a spring 16 which is always in tension and of which the other end is connected to a rod 17 passing out through the end of the chamber 1 and provided with a nut 18 by which its tension can be adjusted. The plate 14 is connected to one end of a spring 19 which is always in tension and of which the other end is connected to a rod 20 passing out through the end of chamber 2 and provided with an adjusting nut 21. Both springs should be under stress when there is zero difference of pressure, and neither spring should be completely free from stress under the maximum difference of pressure with which the instrument is designed to deal. The central portion of the plate 15 is removed and the plate carries a surface 22 against which bears a roller 23 carried by an arm 24 on a spindle 25 which passes out through a stuffing box 26 and carries a pointer 27 moving over a scale 28. This pointer carries a weight 29 which keeps the roller 23 up against the surface 22. It will be understood that when the pressure in the chamber 1 exceeds the pressure in the chamber 2 the central portion 4 of the diaphragm will be moved to the right as seen in Figure 3 and consequently the surface 22 acting upon the roller 23 will turn the spindle 26 and move the pointer 27 over the scale. This construction has the advantage that a movement of the pointer consequent on the movement of the diaphragm is obtained without the employment of bell crank levers or the like within the chamber, which employment is apt to lead to error owing to friction. The pointer also carries a roller 30 which acts upon an arm 31 fast on a rotatively mounted spindle 32 on which is an arm 33 carrying a pen 34 adapted to draw a diagram of the flow upon a chart 35 rotated in any well known manner. The arm 31 is provided with a weight 36 which keeps it normally in contact with the roller 30. 37 is a valve by which the chambers 1 and 2 can be put in communication when it is desired to check the zero position of the diaphragm. 38 is a valve by which air can be allowed to escape from the chambers 1 and 2 in cases where water or steam flow is to be measured as in such a case the chambers should be kept filled with water. 39 is a support or cradle which is carried in any suitable manner by the flange of chamber 1 and is designed to support the corrugations 6 of the diaphragm. It will be seen that this construction enables the diaphragm to be removed and replaced without altering the adjustment of the spring 16. To do this nut 21 is removed whereupon the diaphragm will collapse on to the support, the nuts of the bolts 3 are removed and the chamber 2 is then removed and the diaphragm is thus freed. The zero position of the diaphragm can be adjusted by turning the nut 18.

What I claim is:—

1. An instrument for measuring the flow of a fluid by means of pressure differences comprising a casing, a flexible diaphragm separating the interior of the casing into two chambers, plates secured on opposite sides respectively of the central portion of the diaphragm, a tension spring connected to each plate, means whereby the springs are adjustably anchored to the casing, means for obtaining in the two chambers a pressure difference caused by the flow to be measured, a cradle carried by the casing and adapted to support the annular portion of the diaphragm between the casing and the plates, and means for indicating the movement of the diaphragm.

2. An instrument for measuring the flow of a fluid by means of pressure differences comprising a casing, a flexible diaphragm separating the interior of the casing into two chambers and having an annular corrugation adjacent its edge, plates secured on opposite sides respectively of the central portion of the diaphragm, a tension spring connected to each plate, means whereby the springs are adjustably anchored to the casing, means for obtaining in the two chambers a pressure difference caused by the flow to be measured, a cradle carried by the casing and adapted to engage the corrugation progressively as the diaphragm moves, and means for indicating the movement of the diaphragm.

In testimony that I claim the foregoing as my invention I have signed my name this 12th day of April, 1923.

JOHN LAWRENCE HODGSON.